US009108248B2

(12) United States Patent
Fujii

(10) Patent No.: US 9,108,248 B2
(45) Date of Patent: Aug. 18, 2015

(54) CUTTING INSERT, CUTTING TOOL, AND METHOD OF MANUFACTURING MACHINED PRODUCT USING THEM

(75) Inventor: Kanenori Fujii, Omihachiman (JP)

(73) Assignee: Kyocera Corporation, Kyoto (JP)

( * ) Notice: Subject to any disclaimer, the term of this patent is extended or adjusted under 35 U.S.C. 154(b) by 519 days.

(21) Appl. No.: 13/582,111

(22) PCT Filed: May 27, 2011

(86) PCT No.: PCT/JP2011/062288
§ 371 (c)(1),
(2), (4) Date: Sep. 10, 2012

(87) PCT Pub. No.: WO2011/149091
PCT Pub. Date: Dec. 1, 2011

(65) Prior Publication Data
US 2013/0183109 A1    Jul. 18, 2013

(30) Foreign Application Priority Data

May 27, 2010 (JP) ................................. 2010-121263
May 31, 2010 (JP) ................................. 2010-124744
Jun. 23, 2010 (JP) ................................. 2010-142927

(51) Int. Cl.
B23B 27/04     (2006.01)
B23B 27/16     (2006.01)
(Continued)

(52) U.S. Cl.
CPC ........... B23B 27/1607 (2013.01); B23B 27/005 (2013.01); B23B 27/045 (2013.01); B23B 27/143 (2013.01); B23B 27/22 (2013.01); B23B 2200/081 (2013.01); B23B 2200/087 (2013.01); B23B 2200/321 (2013.01);
(Continued)

(58) Field of Classification Search
CPC B23B 27/045; B23B 27/10; B23B 2200/082; B23B 220/165; B23B 2200/08; B23B 2200/087
See application file for complete search history.

(56) References Cited

U.S. PATENT DOCUMENTS 4,969,779 A  *  11/1990  Barten .......................... 407/114
4,992,008 A     2/1991  Pano
(Continued)

FOREIGN PATENT DOCUMENTS

JP       01-115503 A    5/1989
JP       02-66904 U     5/1990
(Continued)

Primary Examiner — Will Fridie, Jr.
(74) Attorney, Agent, or Firm — Volpe and Koenig, P.C.

(57) ABSTRACT

A cutting insert having low cutting resistance and excellent chip discharge performance is provided. The cutting insert 1 according to an embodiment of the present invention includes an upper surface 2, a lower surface 3, a side surface, and a cutting edge 5 disposed between an intersection of the upper surface 2 and the side surface 4. The upper surface 2 includes a rake surface continuous with the cutting edge 5. The rake surface includes a first rake surface 21 which is located correspondingly to a middle part of the cutting edge 5, and is parallel to a horizontal plane L including the intersection or is inclined downward as the first rake surface separates from the cutting edge 5, and a pair of second rake surfaces which are located on both sides of the first rake surface 21 and are inclined upward as the second rake surfaces separate from the cutting edge 5, and which include concave parts 2231b and 221c. A cutting tool including the cutting insert, and a method of manufacturing a machined product using the cutting tool are also provided.

23 Claims, 12 Drawing Sheets

(51) Int. Cl.
*B23B 27/00* (2006.01)
*B23B 27/14* (2006.01)
*B23B 27/22* (2006.01)

(52) U.S. Cl.
CPC ........... *Y10T 82/10* (2015.01); *Y10T 407/2268* (2015.01); *Y10T 407/235* (2015.01); *Y10T 407/24* (2015.01); *Y10T 407/245* (2015.01)

(56) References Cited

U.S. PATENT DOCUMENTS

| | | | | |
|---|---|---|---|---|
| 5,137,396 | A | * | 8/1992 | Durschinger ................ 407/117 |
| 5,511,911 | A | * | 4/1996 | Katbi et al. ................... 407/114 |
| 5,827,017 | A | | 10/1998 | Tagstrom et al. |
| RE37,595 | E | * | 3/2002 | Lindstedt ...................... 407/116 |
| 6,742,971 | B2 | * | 6/2004 | Tong .............................. 407/117 |
| 6,799,925 | B2 | * | 10/2004 | Ejderklint ..................... 407/116 |
| 7,883,300 | B1 | * | 2/2011 | Simpson et al. .............. 407/115 |
| 2008/0240875 | A1 | | 10/2008 | Nagaya et al. |

FOREIGN PATENT DOCUMENTS

| | | |
|---|---|---|
| JP | 09-174308 | 7/1997 |
| JP | 10-505012 A | 5/1998 |
| JP | 2006-502874 A | 1/2006 |
| JP | 2008-272924 A | 11/2008 |
| JP | 2009-012116 A | 1/2009 |
| WO | WO 96/08330 | 3/1996 |
| WO | WO 2004/035257 A2 | 4/2004 |

\* cited by examiner

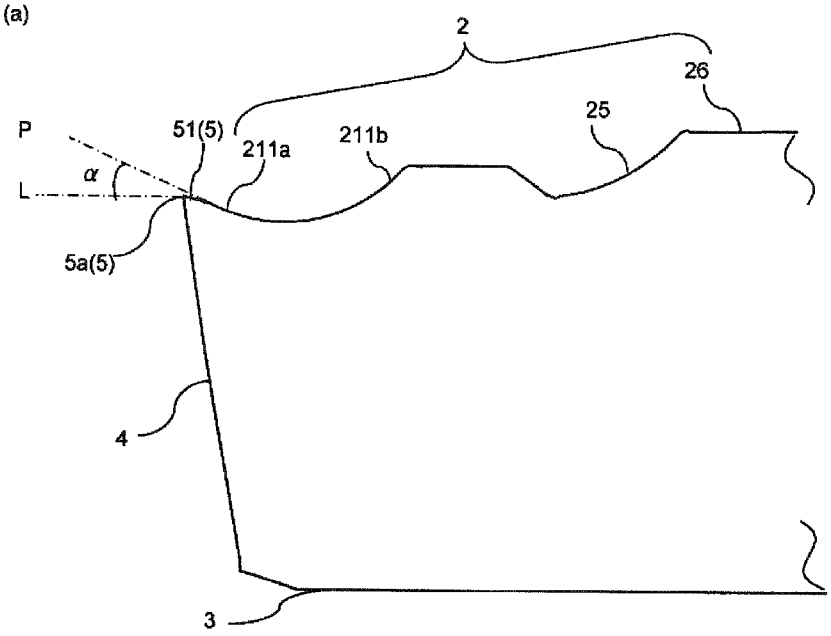
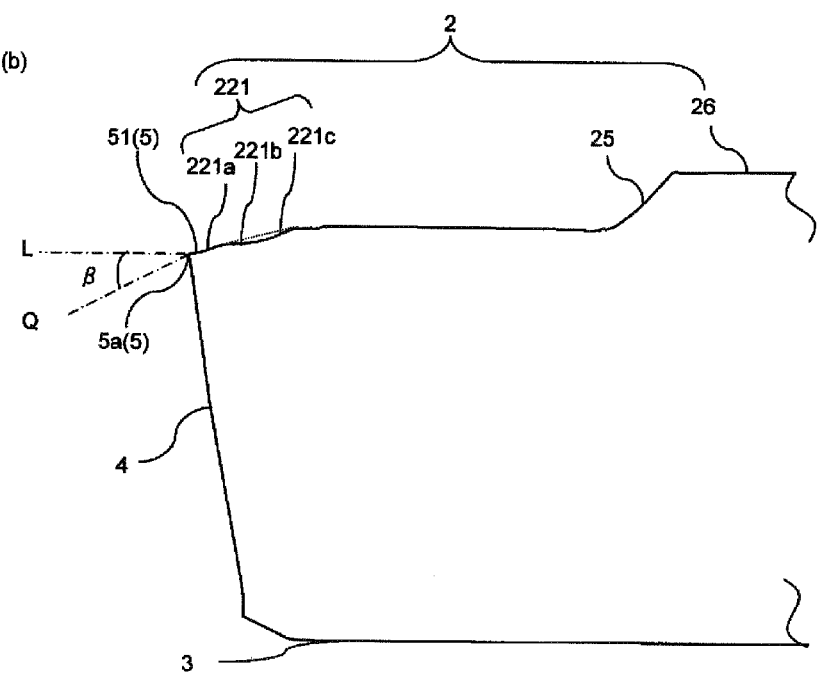
Figure 4

Figure 5
(a)
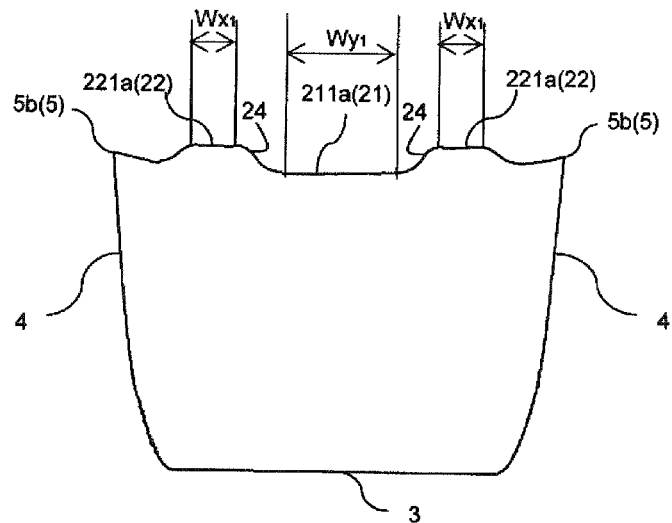
(b)
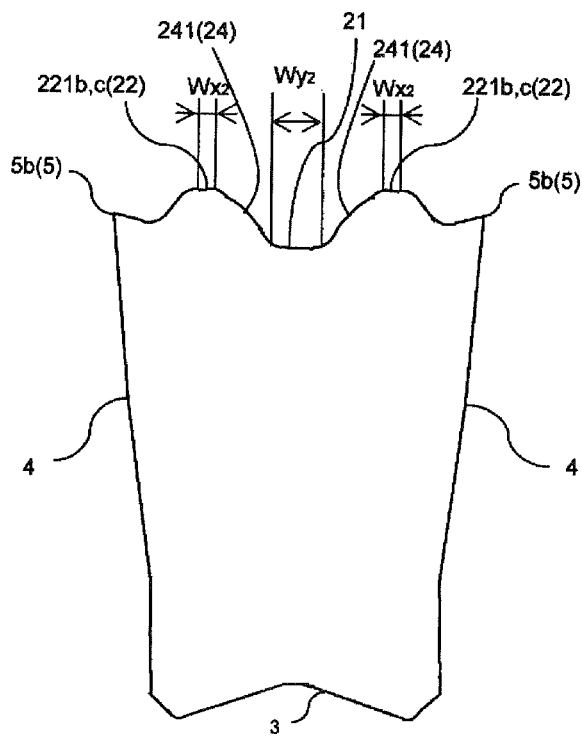

Figure 10
(a)
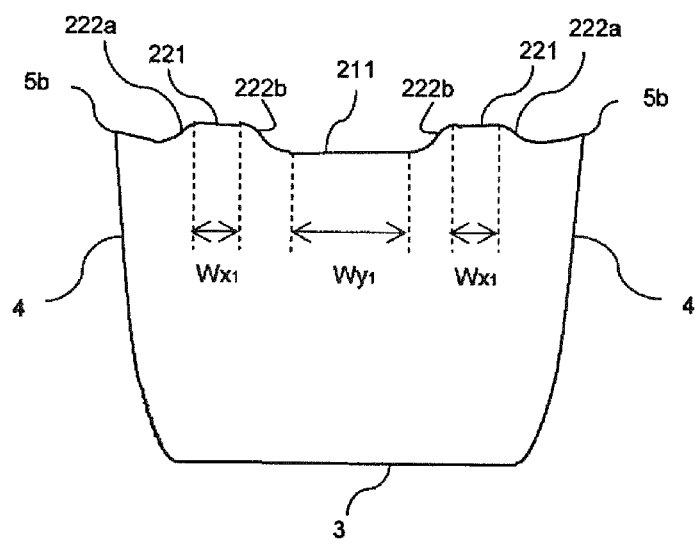
(b)
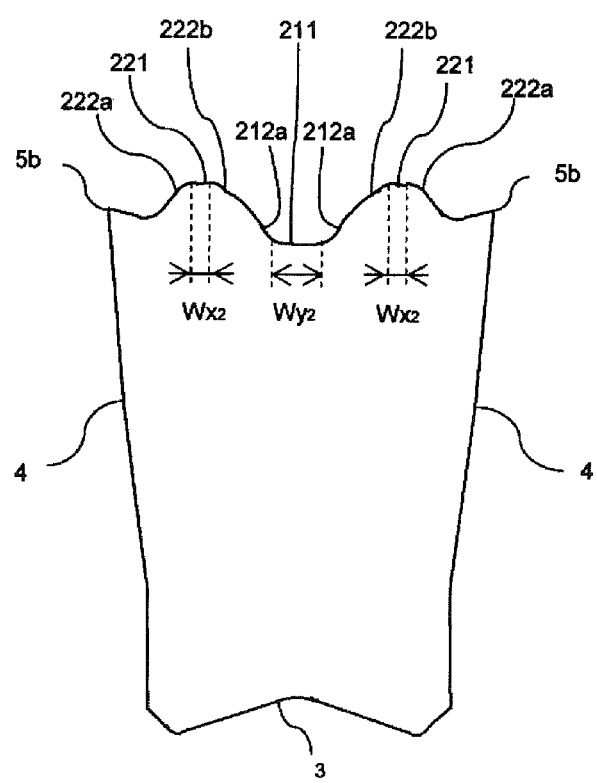

CUTTING INSERT, CUTTING TOOL, AND METHOD OF MANUFACTURING MACHINED PRODUCT USING THEM

TECHNICAL FIELD

The present invention relates to a cutting insert, a cutting tool, and a method of manufacturing a machined product using them.

BACKGROUND ART

In a cutting insert for grooving process, a lower feed rate of the cutting insert tends to reduce the thickness of chips obtained. Thin chips have low rigidity, and hence it may be difficult for the chips to be stably discharged outside.

On the other hand, for example, patent document 1 discloses a cutting insert in which in a rake surface formed continuously with a cutting edge, a region of the rake surface corresponding to a middle part of the cutting edge is inclined downward, and regions of the rake surface corresponding to both end parts of the cutting edge are inclined upward. The chips generated by the cutting insert are deformed in a wave shape depending on the angle of the rake surface, thus enhancing rigidity of the chips.

PRIOR ART DOCUMENT

Patent Document

Patent Document 1: Japanese Unexamined Patent Publication No. 1-115503

SUMMARY OF THE INVENTION

Problems to be Solved by the Invention

However, the regions of the rake surface corresponding to both end parts of the cutting edge in the cutting insert are inclined upward. Therefore, there is a risk that frictional resistance between chips generated and the rake surface increases, and consequently cutting resistance increases.

Thus, there is a need for a cutting insert having low cutting resistance and excellent chip discharge performance.

Means for Solving the Problems

A cutting insert according to a first embodiment of the present invention includes an upper surface, a lower surface, a side surface, and a cutting edge located at an intersection of the upper surface and the side surface. The upper surface includes a rake surface provided continuously with the cutting edge. The rake surface includes a first rake surface which is located correspondingly to a middle part of the cutting edge, and is parallel to a horizontal plane including the intersection or is inclined downward as the first rake surface separates from the cutting edge, and a pair of second rake surfaces which are located on both sides of the first rake surface, and are inclined upward as the second rake surfaces separate from the cutting edge. Each of the pair of second rake surfaces includes a concave part.

A cutting insert according to a second embodiment of the present invention includes an upper surface, a lower surface, a side surface, and a cutting edge located at an intersection of the upper surface and the side surface. The upper surface includes a rake surface provided continuously with the cutting edge. The rake surface includes a first rake surface which is located correspondingly to a middle part of the cutting edge, and is parallel to a horizontal plane including the intersection or is inclined downward as the first rake surface separates from the cutting edge, and a pair of second rake surfaces which are located on both sides of the first rake surface, and are inclined upward as the second rake surfaces separate from the cutting edge. The first rake surface includes a pair of convex parts located separately from each other along a direction parallel to the cutting edge. Each of the pair of convex parts includes an inclined surface inclined upward as the inclined surface separates from the cutting edge.

A cutting insert according to a third embodiment of the present invention includes an upper surface, a side surface including a front clearance surface and a pair of side clearance surfaces connected to the front clearance surface, a front cutting edge located at an intersection of the upper surface and the front clearance surface, and a pair of side cutting edges located at an intersection of the upper surface and the pair of side clearance surfaces. The upper surface includes a first rake surface which is continuous with the front cutting edge and comprises a descending part inclined downward as the descending part separates from the front cutting edge, and a pair of second rake surfaces which is continuous with the front cutting edge and comprises an ascending part inclined upward as the ascending part separates from the front cutting edge, wherein the pair of second rake surfaces which are continuous with both ends of the first rake surface and are located separately from the pair of side cutting edges. Each of the pair of second rake surfaces includes an upper part, a first side part continuous with the side cutting edge located adjacent to the first side part of the pair of side cutting edges in the upper part, and a first curved region at an intersection of the upper part and the first side part, which separates from the adjacent side cutting edge as the first curved region separates from the front cutting edge, and is projected toward the first rake surface in a planar view.

A cutting tool according to an embodiment of the present invention includes a cutting insert according to the foregoing embodiments, and a holder configured to attach the cutting insert thereto.

A method of manufacturing a machined product according to one embodiment of the present invention includes bringing the front cutting edge of the cutting tool according to the foregoing embodiments into contact with a workpiece being rotated; and thereafter, bringing the side cutting edges of the cutting tool into contact with the workpiece being rotated.

A method of manufacturing a machined product according to another embodiment of the present invention includes rotating a workpiece; bringing any one of the cutting edge, the front cutting edge and the side cutting edges of the cutting tool into contact with the workpiece being rotated; and separating the workpiece and the cutting tool from each other.

Effect of the Invention

In the cutting insert according to the first embodiment of the present invention, the rake surface includes the first rake surface which is located correspondingly to the middle part of the cutting edge, and is parallel to the horizontal plane including the intersection or is inclined downward as the first rake surface separates from the cutting edge, and the pair of second rake surfaces which are located on both sides of the first rake surface, and are inclined upward as the second rake surfaces separate from the cutting edge. Each of the pair of second rake surfaces includes the concave part. Therefore, cutting resistance is low in the second rake surfaces whose cutting resistance is apt to increase, and the pair of second rake surfaces make it easier to stabilize chip discharge direction, thereby improving the chip discharge performance.

In the cutting insert according to the second embodiment of the present invention, the rake surface includes the first rake surface which is located correspondingly to the middle part of the cutting edge, and is parallel to the horizontal plane including the intersection or is inclined downward as the first rake surface separates from the cutting edge, and the pair of second rake surfaces which are located on both sides of the first rake surface, and are inclined upward as the second rake surfaces separate from the cutting edge. The first rake surface includes the pair of convex parts located separately from each other along the direction parallel to the cutting edge. Each of the pair of convex parts includes the inclined surface inclined upward as the inclined surface separates from the cutting edge. Therefore, the chip discharge performance is excellent even under cutting conditions that chips are extremely thin and hence the chips flow with lateral oscillations.

In the cutting insert according to the third embodiment of the present invention, when a traversing process is carried out with the side cutting edges, the chips generated by the side cutting edges can be curled by bringing the chips into contact with the first side parts of the pair of second rake surfaces. Additionally, the intersection of the upper part and the first side part includes the first curved region which separates from the adjacent side cutting edge as the first curved region separates from the front cutting edge, and is projected toward the first rake surface in the planar view. Therefore, chip discharge stability can be improved in a wide range of conditions from a low cutting depth to a high cutting depth.

BRIEF DESCRIPTION OF THE DRAWINGS

FIG. 4(a) is a sectional view of the cutting insert shown in FIG. 3 taken along the line A-A; FIG. 4(b) is a sectional view thereof taken along the line B-B;

FIG. 5(a) is a sectional view of the cutting insert shown in FIG. 3 taken along the line C-C; FIG. 5(b) is a sectional view thereof taken along the line D-D;

FIG. 10(a) is a sectional view of the cutting insert shown in FIG. 9 taken along the line C-C; FIG. 10(b) is a sectional view thereof taken along the line D-D;

PREFERRED EMBODIMENTS FOR CARRYING OUT THE INVENTION

<Cutting Insert>
(First Embodiment)

The cutting insert 1 according to the first embodiment of present invention is described with reference to FIGS. 1 to 5.

The cutting insert according to the first embodiment includes an upper surface, a lower surface, a side surface, and a cutting edge disposed at an intersection of the upper surface and the side surface, and the upper surface includes a rake surface formed continuously with the cutting edge. The rake surface includes a first rake surface which is located correspondingly to a middle part of the cutting edge, and is parallel to a horizontal plane including the intersection or is inclined downward as the first rake surface separates from the cutting edge, and a pair of second rake surfaces which are located on both sides of the first rake surface, and are inclined upward as the second rake surfaces separate from the cutting edge, and have a concave part. Therefore, cutting resistance can be reduced in the second rake surfaces subjected to large cutting resistance, and the pair of second rake surfaces facilitate stabilization of chip flow direction and improve chip discharge performance.

The cutting insert 1 of the present embodiment is described in detail below.

FIG. 1(a) is the perspective view of the cutting insert according to the first embodiment of the present invention, FIG. 1(b) is the front view (side view in the longitudinal direction) thereof, FIG. 1(c) is the plan view thereof, and FIG. 1(D) is the side view in the width direction thereof.

As shown in FIG. 1(c), the cutting insert 1 (hereinafter referred to simply as "insert 1" in some cases) has a substantially prismatic shape, and has cutting parts I located at both end portions thereof, and a clamp part II which is located between the cutting parts I, and has a clamp surface 26 brought into contact with a holder 11 when the cutting insert 1 is fixed to the holder by a clamp member of the holder 11. The insert 1 of the present embodiment is usable for internal or external grooving process and cut-off process, and can also be suitably used for shoulder grooving process and a traversing process.

Figure 1:
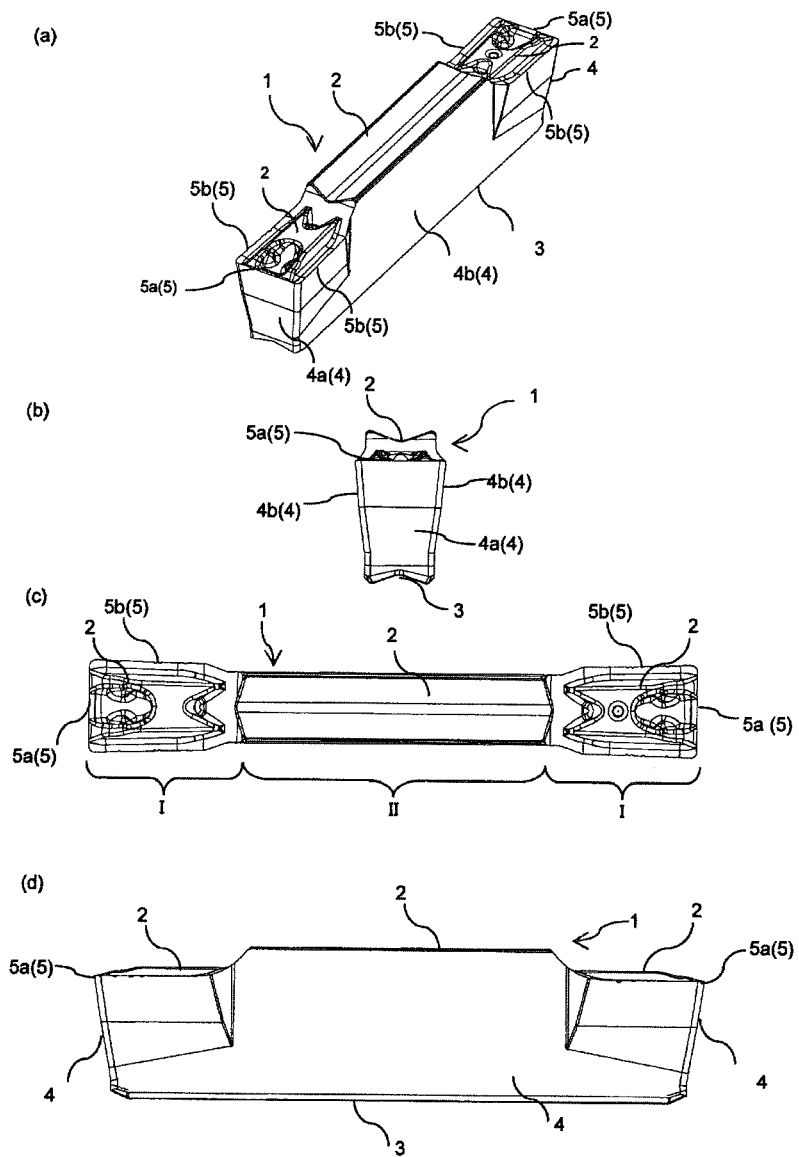
FIG. 1(a) is a perspective view of a cutting insert according to an embodiment of the present invention.
FIG. 1(b) is a front view (side view in a longitudinal direction)
FIG. 1(c) is a plan view thereof.
FIG. 1(d) is a side view thereof in a width direction.
Figure 2:
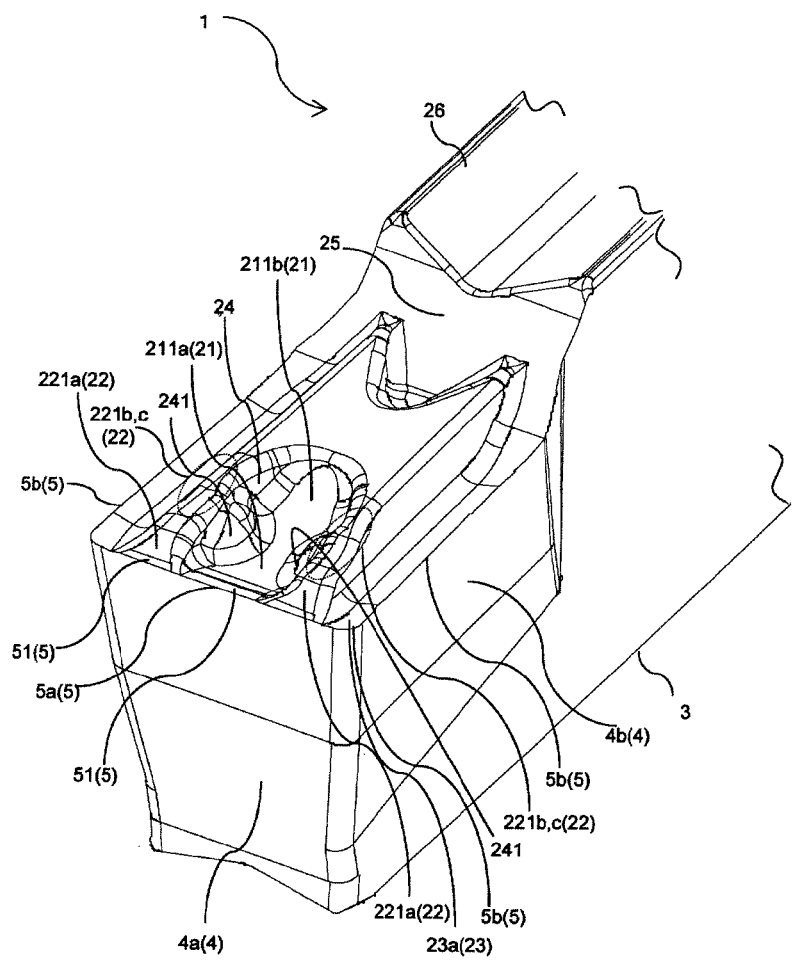
FIG. 2 is a partially enlarged perspective view of cutting parts I and a clamp part II of the cutting insert shown in FIG. 1.

FIG. 2 is the enlarged perspective view of the cutting parts I of the cutting insert 1 shown in FIG. 1.

As shown in FIG. 2, each of the cutting parts I includes an upper surface 2, a lower surface 3, a side surface 4 connected to the upper surface 2 and the lower surface 3. The upper surface 2 functions as the rake surface. The lower surface 3 functions as a placement surface to be placed on the holder. The side surface 4 functions as a flank surface. As shown in FIG. 1(b), the side surface 4 includes a front clearance surface 4a located closer to a front side thereof, and a pair of side clearance surfaces 4b connected to the front clearance surface 4a.

Some examples of the material of the cutting insert 1 are cemented carbide and cermet. Some examples of the composition of cemented carbide are WC—Co produced by adding powder of cobalt (Co) to tungsten carbide (WC), followed by sintering, WC—TiC—Co obtained by adding titanium carbide (TiC) to WC—Co, and WC—TiC—TaC—Co obtained by adding tantalum carbide (TaC) to WC—TiC—Co. The cermet is a sintered composite material obtained by compositing metal with ceramic ingredients, and specific examples thereof are materials composed mainly of titanium compounds, such as titanium carbide (TiC) and titanium nitride (TiN).

The surface of the cutting insert 1 may be coated with a coating film by using chemical vapor deposition (CVD) method or physical vapor deposition (PVD) method. Some examples of the coating film composition to be coated are titanium carbide (TiC), titanium nitride (TiN), titanium carbonitride (TiCN), and alumina (Al2O3).

In the present embodiment, a length in the width direction of the insert 1 is 2 to 6 mm, and a length of the longitudinal direction of the insert 1 is 20 mm. A height between the lower surface 3 and the upper surface of the insert 1 is selected from the range of 4 to 6 mm according to the length in the width direction of the insert 1.

A cutting edge 5 is provided at an intersection of the upper surface 2 and the side surface 4. The insert 1 of the present embodiment has a front cutting edge 5a at an intersection in the width direction of the cutting parts I, namely, an intersection of the upper surface 2 and the front clearance surface 4a, and a side cutting edge 5b at an intersection in the longitudinal direction of the cutting parts I, namely, an intersection of the upper surface 2 and the side clearance surface 4b, and a curveline shaped curved part at a position to connect the front cutting edge 5a and the side cutting edge 5b.

The cutting edge 5 may include a land 51. The land 51 is a narrow band-shaped region having a substantially constant width located closer to the upper surface 2 in the intersection of the cutting parts I. When the cutting edge 5 is continuous with the rake surface, particularly the first rake surface 21, the strength at the front end of the cutting edge 5 can be improved to reduce fracture by including the land 51.

The upper surface 2 includes rake surfaces (first rake surface 21 and second rake surface 22) located inwardly of the cutting edge 5. The rake surfaces have a role in guiding chips toward a discharge direction while allowing the chips to graze along the rake surfaces. In the present embodiment, as shown in FIG. 2, each of the rake surfaces includes the first rake surface 21 located inwardly of a middle part of the front cutting edge 5a, the pair of second rake surfaces 22 located on both sides of the first rake surface 21, a pair of corner rake surfaces 23 respectively continuous with a pair of corner cutting edges 5c. In the present specification, the term "inwardly" denotes the center of an insert body with reference to the cutting edge 5 in a planar view, unless otherwise specified. The corner rake surfaces 23 include a descending part 23a inclined downward as the descending part 23a separate from the corner cutting edge 5c in the entire region of the corner cutting edge 5c.

Figure 3:
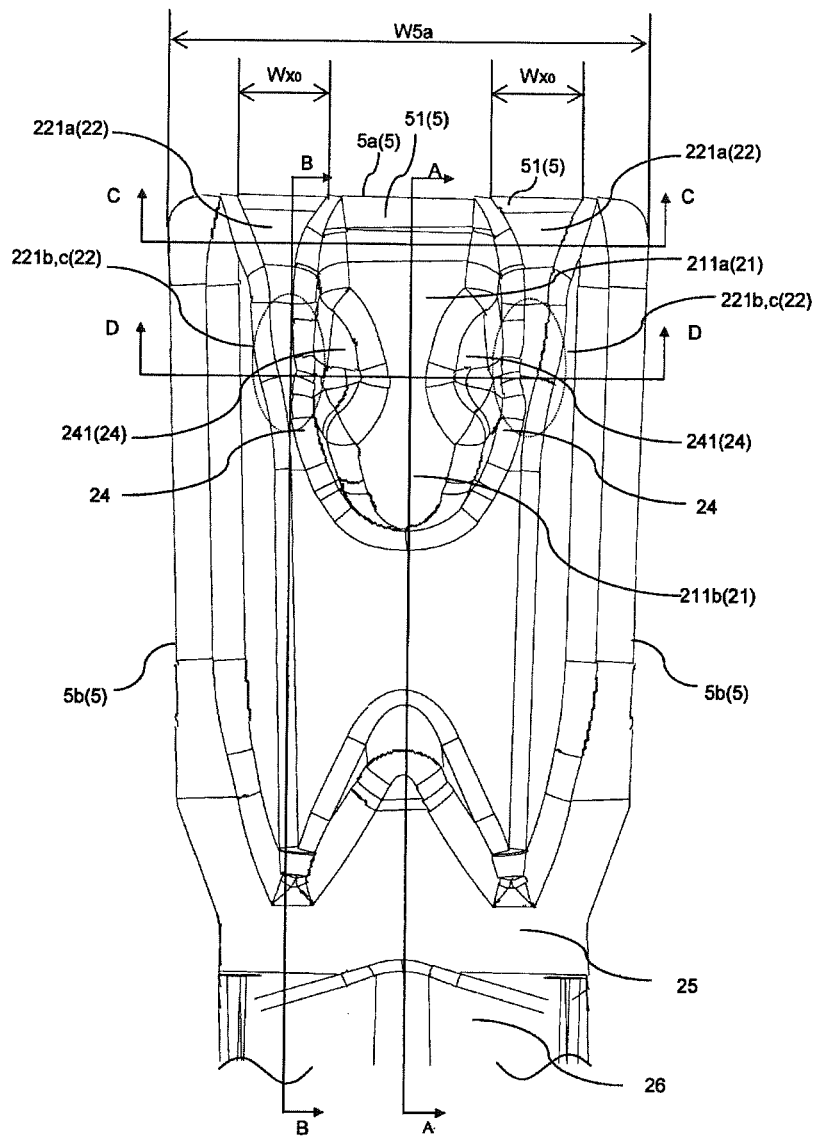
FIG. 3 is a partially enlarged plan view of the cutting parts I and the clamp part II of the cutting insert shown in FIG. 1.

FIG. 3 is the partially enlarged plan view of the cutting parts I of the cutting insert shown in FIG. 1. FIG. 4(a) is the sectional view of the cutting insert shown in FIG. 3 taken along the line A-A; FIG. 4(b) is the sectional view thereof taken along the line B-B;

The first rake surface 21 includes a descending part 211a which is parallel to a horizontal plane L including the front cutting edge 5a, or is inclined so as to approach the lower surface 3 as the descending part 211a separates from the front cutting edge 5a. The second rake surface 22 includes an ascending part (front rake part) 221a inclined so as to separate from the lower surface 3 with respect to the horizontal plane L including the front cutting edge 5a as the ascending part 221a separates from the front cutting edge 5a. In the present specification, the term "horizontal plane" denotes a plane parallel to a predetermined plane on which the cutting insert is placed.

Owing to the foregoing structures, the chips generated from the front cutting edge 5a are deformed according to the first and second rake surfaces along which the chips graze. To be specific, the cross section of the middle part of the chip after grazing along the first rake surface 21 is deformed into a concave shape and both end portions of the chip after grazing along the second rake surface 22 are deformed into a convex shape, resulting in a wave shape. This enhances the rigidity of the chips, thus allowing the chips to be curled in the shape of a spring. Further, the chip deformed into the wave shape has a smaller width than the width of the front cutting edge 5a, namely, the width of one side of the cutting parts I, thereby mitigating damage to a machined surface of a workpiece around the chips. Additionally, the foregoing structures make it easier to stabilize a chip flow direction in a direction from the front cutting edge 5a to the clamp surface 26.

To be specific, as shown in FIGS. 4(a) and 4(b), the horizontal plane including the front cutting edge 5a is represented by L. An angle formed by a virtual extension line P of the descending part 211a of the first rake surface 21 and the horizontal plane L is represented by a rake angle $\alpha$. An angle formed by a virtual extension line Q of the front rake surface 221a of the second rake surface 22 and the horizontal plane L is represented by a rake angle $\beta$. An inclination direction in which the virtual extension line P is rotated so as to further separate from the lower surface 3 than the horizontal plane L is taken as positive. An inclination direction in which the virtual extension line Q is rotated so as to further approach the lower surface 3 than the horizontal plane L is taken as negative. Accordingly, $\alpha \geq 0°$, and $\beta < 0°$. Because FIG. 4 is the side view, the horizontal plane L is expressed by a straight line.

From the viewpoint of maintaining the insert strength, the rake angle a is preferably 10° to 30°. From the viewpoint of reducing cutting resistance, the rake angle $\beta$ is preferably −10° to −20°. Further, from the viewpoint of reducing the cutting resistance, an absolute value of a difference between the rake angle $\alpha$ and the rake angle $\beta$ is preferably 25° to 30°. For example, in the present embodiment, the rake angle $\alpha$ is 16°, and the rake angle $\beta$ is −12°. In this case, an absolute value of the difference between the rake angle $\alpha$ and the rake angle $\beta$ ($|\alpha-\beta|$) is 28°.

The width of the second rake surface 22 is decreased as the second rake surface 22 separates from the front cutting edge 5a in a planar view. Specifically, Wx1>Wx2, where Wx1 is a width of the second rake surface 22 in FIG. 5(a), and Wx2 is a width of the second rake surface 22 in FIG. 5(b). Thus, by reducing a contact area between the second rake surface 22 and the chips as the contact area separates from the lower surface 3, abrasion resistance can be reduced, thereby reducing cutting resistance. From the viewpoint of reducing cutting resistance, as shown in FIG. 3, a sum of both maximum widths Wx0 of the pair of second rake surfaces 22 is preferably 30% to 50% of a width W5a of the front cutting edge 5a, where Wx0 is a maximum width of the second rake surface 22.

The second rake surface 22 is provided with concave parts 221b and 221c. The second rake surface 22 has a negative rake angle $\beta$, and hence is subjected to the largest resistance. By including the concave parts 221b and 221c, the contact area between the chips and the second rake surface 22 can be reduced, thereby reducing the cutting resistance. Although in the present embodiment, the single concave part 221b and the single concave part 221c are formed as shown in FIG. 4(a), no special limitation is imposed on the number of the concave parts 221b and 221c. For example, a plurality of concave parts may be formed in the second rake surface 22.

As shown in FIG. 4(b), the second rake surface 22 includes a front rake surface 221a configured to be separated from the lower surface 3. The concave parts 221b and 221c are preferably located on a side further away from the front cutting edge 5a than a front rake part 221a. This structure allows the chip discharge direction to be fixed on the front rake part 221a, thus enhancing the rigidity of the chips. Thereafter, the chips reach the concave parts 221b and 221c, thereby further stabilizing the chip discharge direction.

The second rake surface 22 also has a role in controlling the chips generated from the side cutting edge 5b in a traversing process for increasing groove width. In this case, owing to the concave parts 221b and 221c included in the second rake surface, the height from the lower surface 3 is lowered, and the shock exerted on the chips generated from the side cutting edge 5b can be mitigated, thereby preventing the chips from getting caught in a machined groove.

Boundary parts 24 are respectively disposed between the first rake surface 21 and the pair of second rake surfaces 22. The boundary parts 24 are configured to be separated from the lower surface 3 as the boundary part 24 approaches the second rake surface 22 from the first rake surface 21. The boundary parts 24 include a region which is continuous with the front cutting edge 5a, and reduces the distance between the boundary parts 24 as the region separates from the front cutting edge 5a. Specifically, Wy1>Wy2, where Wy1 is a distance from an end portion of one boundary part 24 closer to the first rake surface 21 to an end portion of the other boundary part 24 closer to the first rake surface 21 in FIG. 5(a), and Wy2 is a distance from the end portion of one boundary part 24 closer to the first rake surface 21 to the end portion of the other boundary part 24 closer to the first rake surface 21 in FIG. 5(b). This allows the chips to be more surely deformed so as to be the smaller width than the width of the cutting parts I.

As shown in FIG. 3, the boundary parts 24 respectively include convex parts 241. The convex parts 241 are provided for deforming generated chips into a spring shape, and dividing and discharging the chips. The convex parts 241 are preferably disposed at a position corresponding to the concave parts 221a and 221c in a direction along the front cutting edge 5a.

Specifically, in FIG. 3, the convex parts 241 pass through the middle parts of the concave parts 221b and 221c, and are located on a perpendicular line with respect to the side cutting edge 5b. This reduces cutting resistance increased due to the chips brought into contact with the convex parts 241. Further, the convex parts 241 are preferably disposed at positions further away from the front cutting edge 5a than the front rake part 221a. This structure firstly enhances the rigidity of the chips, and allows the chips to be deformed into the spring shape by the convex parts 241, and then to be divided and discharged. Consequently, the chip discharge performance is further improved.

As shown in FIG. 4(a), the upper surface 2 may further include an inclined part 25 in addition to the ascending part 211b of the first rake surface 21, on a side further away from the front cutting edge 5a than the convex parts 241. The ascending part 211b and the inclined part 25 are provided for deforming the generated chips into the spring shape, and for dividing and discharging the chips. Hence, even when the generated chips with insufficient rigidity climb over the convex parts 241, these chips can be divided by the ascending part 211b and the inclined part 25.

The inclined part 25 is formed continuously with the clamp surface 26 brought into contact with the holder when the insert 1 is fixed to the holder. An end portion of the inclined part 25 closer to the clamp surface 26 is located at the highest position on the upper surface 2. This structure can reduce the probability that the chips after climbing over the ascending part 211b collide with the holder, thus causing wear of the holder. An inclination angle of the inclined part 25 is suitably set according to cutting conditions, and is usually set in the range of approximately 20° to 40°.

(Second Embodiment)

A cutting insert according to a second embodiment of the present invention is described in details below by mainly referring to FIGS. 6 and 7. Since the basic structure of the cutting insert is identical to that of the foregoing cutting insert of the first embodiment, some of the descriptions of the same elements are omitted for convenience' sake by using the same reference numerals. In the following description, FIGS. 1 to 5 are also referred to when necessary.

The cutting insert according to the second embodiment includes an upper surface, a lower surface, a side surface, and a cutting edge disposed at an intersection of the upper surface and the side surface. The upper surface includes a rake surface formed continuously with the cutting edge. The rake surface includes a first rake surface which is located correspondingly to a middle part of the cutting edge, and is parallel to a horizontal plane including the intersection or is inclined so as to approach the lower surface as the rake surface separates from the cutting edge, and a pair of second rake surfaces which are located on both sides of the first rake surface, and are inclined so as to separate from the lower surface with respect to the horizontal plane as the second rake surfaces separate from the cutting edge. The first rake surface is provided with a pair of convex parts which are located in a direction parallel to the cutting edge and are separated from each other. The convex parts respectively have inclined surfaces inclined so as to separate from the lower surface as the inclined surface separates from the cutting edge. Therefore, excellent chip discharge performance is excellent even when chips are extremely thin and hence the chips flow with lateral oscillations.

In the foregoing insert as described in the patent document 1, the region of the rake surface formed continuously with the cutting edge which corresponds to the middle part of the cutting edge is inclined downward, and the regions of the rake surface corresponding to both end portions of the cutting edge are inclined upward. The angle difference in the rake surface permits the wave-shaped deformation of the chips generated and makes it easier to enhance the rigidity thereof. However, when the chips are extremely thin, the chips flow with the lateral oscillations, and in some cases, chip discharging performance may deteriorate.

The cutting insert 1 according to the present embodiment is described in details below.

The first rake surface 21 includes a pair of convex parts 241 which are located in a direction parallel to the front cutting edge 5a and are separated from each other. The convex parts 241 are provided for preventing the chips from flowing with the lateral oscillations. Specifically, the lower part of the chips are contacted with and supported by the convex parts 241. It is therefore capable of preventing the chips from flowing with the lateral oscillations, for example, even when the chips are extremely thin.

The convex parts 241 are disposed so that an inclined surface 241a inclined so as to separate from the lower surface 3 as the inclined surface 241a separates from the front cutting edge 5a in a planar view is located on a line orthogonal to the front cutting edge 5a in the planar view. This structure makes it easier for the chips to contact with the inclined surface 241a, and ensures a proper contact area therebetween, thereby more surely preventing the chips from flowing with the lateral oscillations.

No special limitation is imposed on the shape of the inclined surface 241a. In order to more surely bring the chips into contact with the inclined surface 241a, in the present embodiment, the inclined surface 241a is preferably curved toward the lower surface 3 in a sectional view in a direction perpendicular to the front cutting edge 5a, as shown in FIG. 7.

For the purpose of more satisfactory support of the chips, the inclined surface 241a is also inclined so as to separate from the lower surface 3 as the inclined surface 241a approaches the side cutting edge 5b in a sectional view parallel to the width direction of the cutting parts I, as shown in FIG. 5(b).

Figure 6:
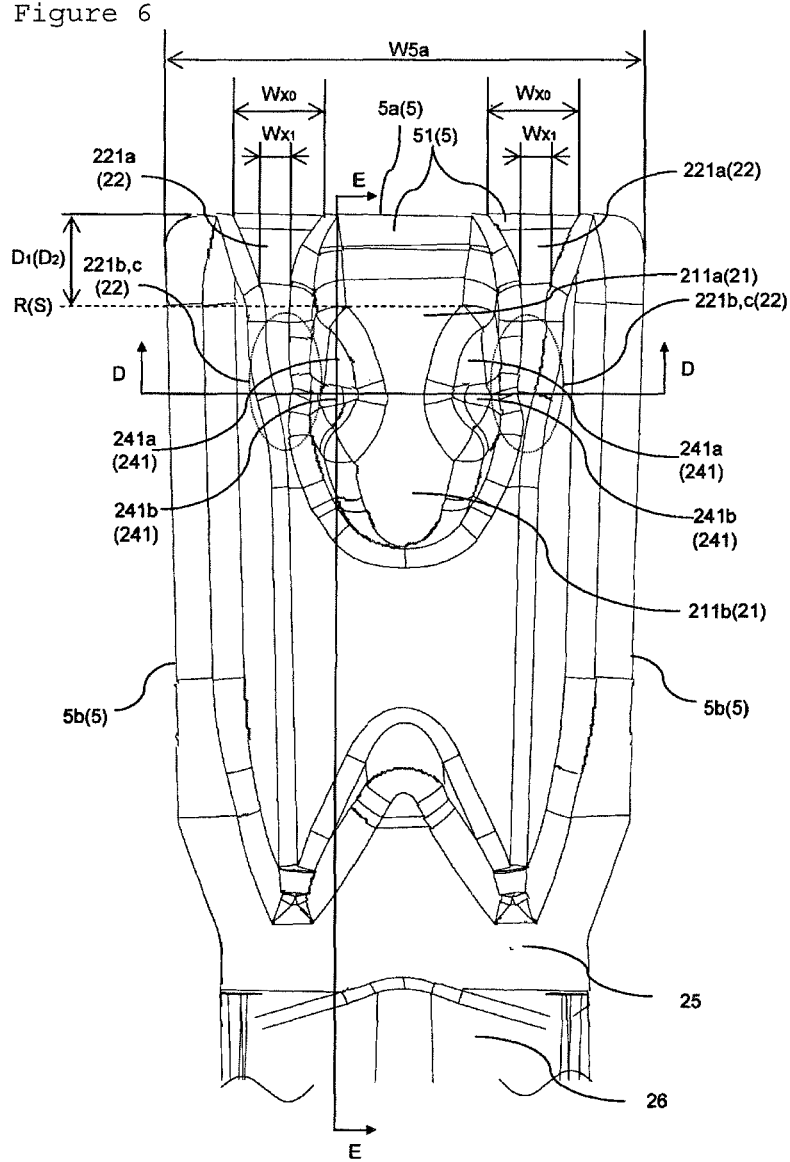
FIG. 6 is a partially enlarged plan view of the cutting parts I and the clamp part II of the cutting insert shown in FIG. 1.

As shown in FIG. 6, the width of the inclined surface 241a increases as the inclined surface 241a separates from the front cutting edge 5a in a planar view. This structure allows the contact area with the chips to be gradually increased toward the chip discharge direction. Therefore, more satisfactory chip discharge performance can be expected.

Figure 7:
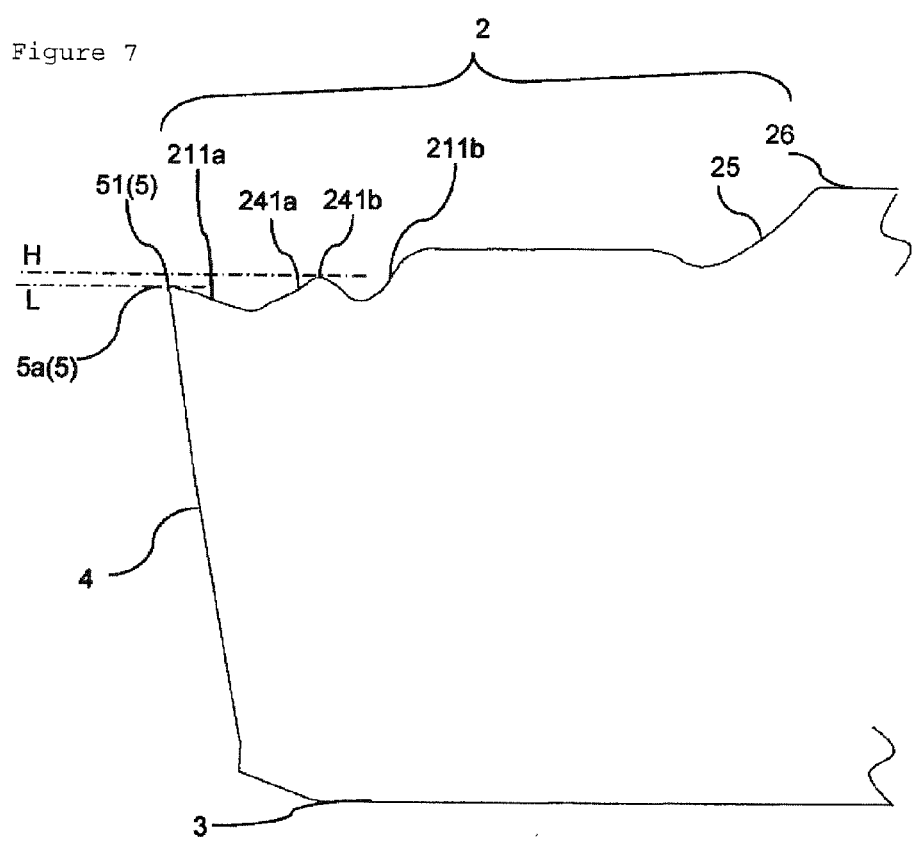
FIG. 7 is a sectional view of the cutting insert shown in FIG. 6 taken along the line E-E.

In the present embodiment, as shown in FIG. 7, the inclined surface 241a is continuous with a top portion 241b in the convex part 241 which is separated from the lower surface by the largest distance. No special limitation is imposed on the height of the top portion 241b. In the present embodiment, the top portion 241b of the convex part 241 is higher than the front cutting edge 5a. Specifically, as shown in FIG. 7, a horizontal plane H including the top portion 241b is located at a higher position than the horizontal plane L. This structure makes it easier for the chips generated from the front cutting edge 5a to contact with the convex part 241, thereby achieving more sure support of the chips.

The pair of convex parts 241 and 241 may be disposed at optional regions of the upper surface 2 as long as the convex parts 241 and 241 have the foregoing structure. As a preferred positional relationship, the pair of convex parts 241 and 241 are respectively disposed at end portions of the first rake surface 21, specifically, at the end portions thereof closer to the pair of second rake surfaces 22. As shown in FIG. 6, the convex parts 241 are respectively formed continuously with the second rake surfaces 22 in the planar view. This structure supports the lower parts of the deformed chips from both sides in the width direction of the cutting parts I, thereby more satisfactorily preventing the chips from flowing with the lateral oscillations.

Further in the present embodiment, the pair of convex parts 241 and 241 have an equal distance from their respective end portions closer to the front cutting edge 5a to the front cutting edge 5a. This structure allows the chips to contact with either one of the convex parts at the same timing, thereby facilitating more stable discharge of the chips.

To be specific, as shown in FIG. 6, a straight line R and a straight S coincide with each other, where R and S are straight lines in the pair of convex parts 241 and 241 which respectively pass through the end portion thereof closer to the front cutting edge 5a and are parallel to the front cutting edge 5a. That is, D1=D2, where D1 and D2 are respectively distances from the straight lines R and S to the front cutting edge 5a.

In the present embodiment, the convex parts 241 are preferably disposed at positions corresponding to the concave parts 221b and 221c in a direction along the front cutting edge 5a. Specifically, in FIG. 6, a straight line D passing through the top portions 241b of the pair of convex parts 241 passes through the concave parts 221b and 221c. This reduces cutting resistance increased due to the chips brought into contact with the convex parts 241. Preferably, the convex parts 241 are disposed at positions further away from the front cutting edge 5a than the front rake part 221a. Owing to this structure, after the chips can be sufficiently deformed into the wave shape so as to have enhanced rigidity, the chips can be discharged while being supported by the convex parts 241. Consequently, chip discharge performance is further improved.

(Third Embodiment)

A cutting insert according to a third embodiment of the present invention is described in details below by mainly referring to FIGS. 8 and 10. Since the basic structure of the cutting insert is identical to that of the foregoing cutting insert of the first embodiment, some of the descriptions of the same elements are omitted for convenience' sake by using the same reference numerals. In the following description, FIGS. 1 to 5 are also referred to when necessary.

The cutting insert according to the third embodiment includes an upper surface, a side surface having a front clearance surface and a pair of side clearance surfaces connected to the front clearance surface, a front cutting edge located at an intersection of the upper surface and the front clearance surface, and a pair of side cutting edges located at an intersection of the upper surface and the pair of side clearance surfaces. The upper surface includes a first rake surface having a descending part which is continuous with the front cutting edge, and is inclined downward as the descending part separates from the cutting edge, and a pair of second rake surfaces having an ascending part which is continuous with the front cutting edge, and is inclined upward as the ascending part separates from the front cutting edge. The second rake surfaces are respectively continuous with both ends of the first rake surface, and are located separately from the pair of side cutting edge. Each of the pair of second rake surfaces includes an upper part and a first side part continuous with the side cutting edge located adjacent to the first side part of the pair of side cutting edges in the upper part. An intersection of the upper part and the first side part includes a first curved region which separates from the adjacent side cutting edge as the first curved region separates from the cutting edge, and is projected toward the first rake surface in the planar view. This permits application to grooving process or the like. Additionally, when a traversing process is carried out with the side cutting edges, chips generated by the side cutting edges can be curled by bringing the chips into contact with the first side parts of the second rake surfaces. Further, chip discharge stability can be improved in a wide range of conditions from a low cutting depth to a high cutting depth, by the fact that the intersection of the upper part and the first side part in the pair of second rake surfaces separates from the adjacent side cutting edge as the intersection separates from the front cutting edge, and the intersection includes the first curved region projected toward the first rake surface in the planar view.

In contrast, the cutting insert of the foregoing patent document 1 has the structure as shown in FIG. 2 thereof. Therefore, the end portions of upper surfaces of front chip deflector surfaces 29a and 29b which are closer to side cutting edges 25a and 25b are in the shape of being projected toward the side cutting edges 25a and 25b in a planar view. Hence, there is a risk that when the traversing process is carried out with the side cutting edges 25a and 25b, chips extend so as to jump over the front chip deflectors surfaces 29a and 29b without being curled, and the chips stick to other components and a workpiece. This phenomenon may become obvious when the chips are thin, or when the chips are apt to extend unstably, or when cutting a workpiece composed of a material having excellent ductility.

The cutting insert 1 of the present embodiment is described in detail below.

Similarly to the foregoing first embodiment, the upper surface 2 includes rake surfaces (first rake surface 21 and second rake surface 22). The rake surfaces have a role in guiding chips toward a discharge direction while allowing the chips to graze along the rake surfaces. In the present embodiment, as shown in FIG. 8, the rake surface includes the first rake surface 21 located inwardly of a middle part of the front cutting edge 5a, the pair of second rake surfaces 22 located on both sides of the first rake surface 21, a pair of corner rake surfaces 23 respectively continuous with a pair of corner cutting edges 5c. The term "inwardly" denotes the center of an insert body with reference to the cutting edge 5 in a planar view. The corner rake surfaces 23 include a descending part 23a inclined downward as the descending part 23a separates from the corner cutting edge 5c in the entire region of the corner cutting edge 5c.

Figure 9:
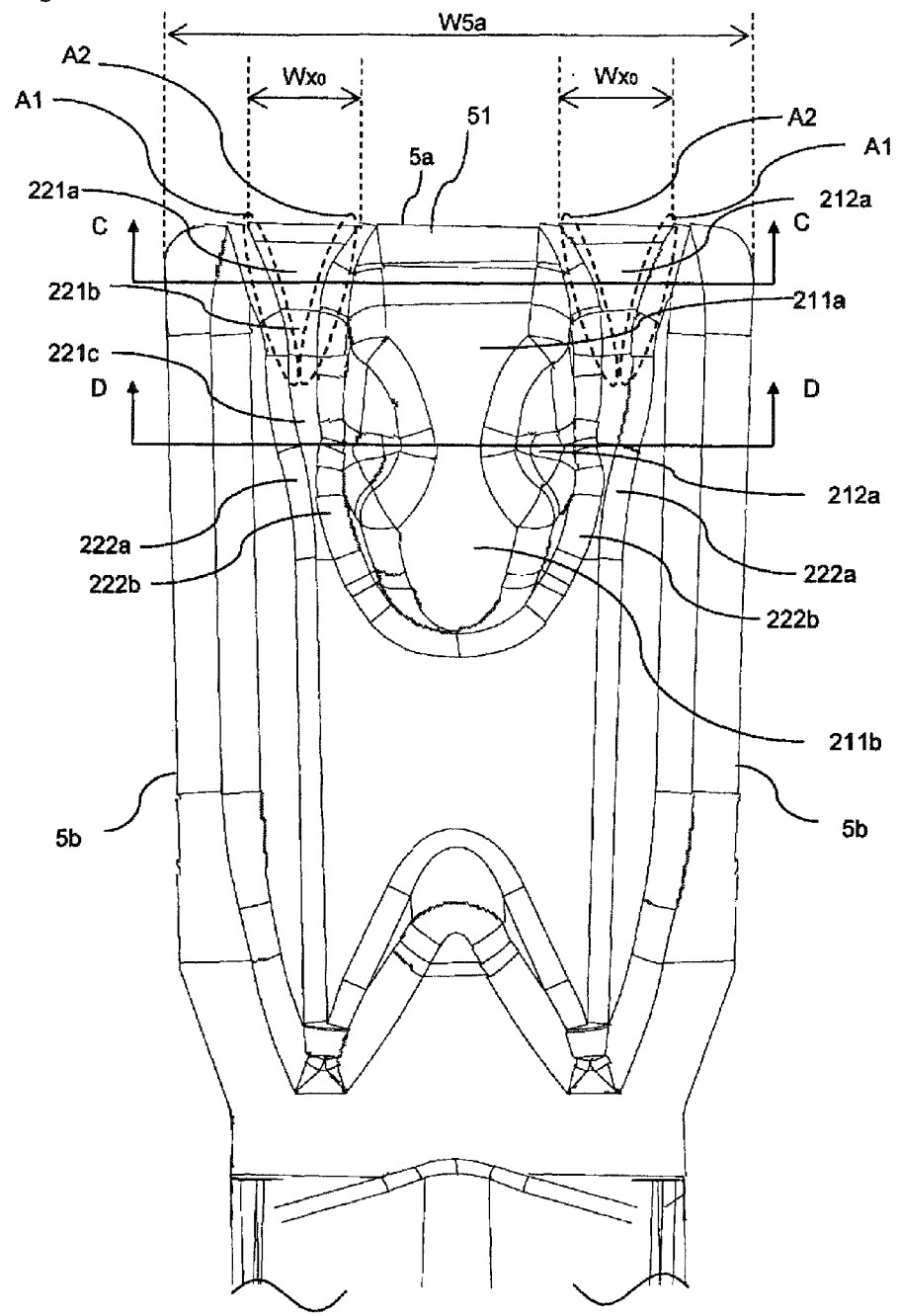
FIG. 9 is a partially enlarged plan view of the cutting parts I and the clamp part II of the cutting insert shown in FIG. 1.

Owing to the rake surface having the above structure, when a traversing process for forming grooves is carried out in grooving process, chips generated from the front cutting edge 5a have different thicknesses depending on the location of the rake surfaces along which the chips graze, resulting in the shape of a wave shape whose middle part has a concave shape and both end portions have a convex shape. FIG. 10(a) is the sectional view of the cutting insert shown in FIG. 9 taken along the line C-C, and FIG. 10(b) is the sectional view thereof taken along the line D-D. The rake surfaces (first rake surface 21 and second rake surface 22) have the above cross-sectional shape, thereby allowing the chips to be deformed according to the shape of the rake surfaces. Thus, the chips are deformed in the wave shape in the sectional view, and therefore become narrower than the width in the width direction of the cutting parts I, thereby reducing the probability that the chips impair a machined surface of a workpiece or components existing around the chips. Further, the pair of second rake surfaces 22 respectively include an upper part 221 and side parts 222 (first side part 222a and second side part 222b) as shown in FIG. 9, and have a substantially trapezoidal shape in a sectional view parallel to the front cutting edge 5. Therefore, the second rake surfaces 22 also have a role in reducing lateral oscillation of the chips by making it easier to stabilize the chip flow direction in a certain direction. In the second rake surfaces 22, as shown in FIG. 9, the intersection of the upper part 221 and the second side part 222b (corresponding to a part of the boundary part 24 in the first embodiment) preferably include a second curved region A2 which approaches the adjacent side cutting edge 5b as the second curved region A2 separates from the front cutting edge 5b, and is projected toward the adjacent side cutting edge 5b in a planar view.

Figure 8:
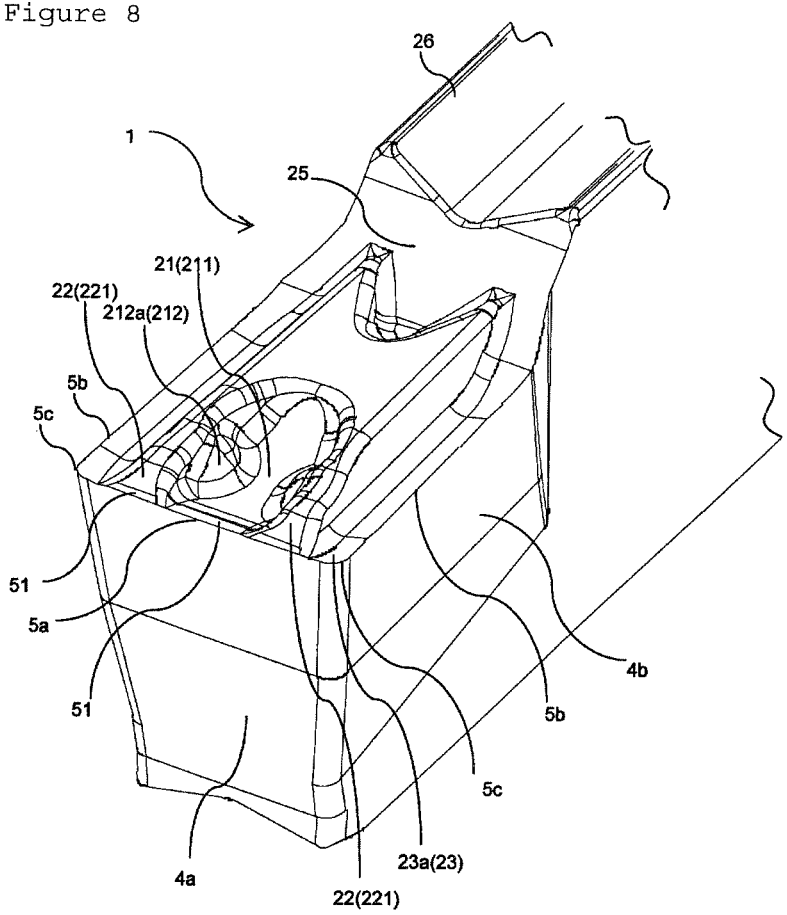
FIG. 8 is a partially enlarged plan view of the cutting parts I and the clamp part II of the cutting insert shown in FIG. 1.

As shown in FIG. 8, the first rake surface 21 includes a bottom part 211 extended inwardly from the front cutting edge 5a. As shown in FIG. 9 and FIG. 4(a), the bottom part 211 includes the above-mentioned descending part 211a and an ascending part 211b lying continuously with the descending part 211. Owing to this structure, even when the chips generated by the front cutting edge 5a climb over a convex part 212a described later, these chips can be divided through their contact with the ascending part 211b. In the present embodiment, the bottom part 211 is a surface made up of flat surfaces and curved surfaces which are continuous with each other, and the bottom part 211 is configured to be smooth without corner, as shown in FIG. 9.

Preferably, the bottom part 211 includes a region which is continuous with the front cutting edge 5a, and has a smaller width as the region separates from the front cutting edge 5a. Specifically, as shown in FIGS. 10(a) and 10(b), the width of the bottom part 211 has a relationship of Wy1>Wy2. This allows the chips to be more surely deformed into a U-shape.

Further, a side part 212 (corresponding to a part of the boundary part 24 in the first embodiment) exists around the bottom part 211, and the side part 212 includes the convex part 212a projecting in the vicinity of a middle portion of the bottom part 21, as shown in FIG. 9. The convex part 212a has a role in deforming the chips generated by the front cutting edge 5a into a spring shape, and dividing and discharging the chips. The convex part 212a is preferably disposed close to an intermediate rake part 221b described later in a direction along the front cutting edge 5a. Specifically, in FIG. 9, the convex part 212a is located near an inward side end portion of the intermediate rake part 221b. This mitigates cutting resistance increased by the chips brought into contact with the convex part 212a. Preferably, the convex part 212a is disposed at a position further away from the front cutting edge 5a than the front rake part (ascending part) 221a. This structure firstly enhances the rigidity of the chips, and allows the chips to be deformed into the spring shape by the convex parts 212a, and then to be divided and discharged. Consequently, the chip discharge performance is further improved.

As shown in FIG. 8, the second rake surface includes an upper part 221 extending inwardly from the front cutting edge 5a. In the present embodiment, the upper part 221 is a surface made up of flat surfaces and curved surfaces which are continuous with each other, and the upper part 221 is configured to be smooth without corner, as shown in FIG. 9. Preferably, the upper part 221 includes a region which is continuous with the front cutting edge 5a, and has a smaller width as the region separates from the front cutting edge 5a. Specifically, Wx1>Wx2, where Wx1 is a width of the second rake surface 22 in FIG. 10(a), and Wx2 is a width of the second rake surface 22 in FIG. 10(b). With this structure, cutting resistance can be reduced by decreasing a contact area between the second rake surface 22 and the chips as the contact area separates from the front cutting edge 5a. From the viewpoint of reducing the cutting resistance, as shown in FIG. 9, a sum of both maximum widths Wx0 of the pair of second rake surfaces 22 is preferably 30% to 50% of a width W5a from the front cutting edge 5a to a corner cutting edge 5c, wherein Wx0 is a maximum width of the second rake surface 22.

The upper part 221 of the second rake surface 22 includes inwardly a front rake part 221a, the intermediate rake part 221b and a rear rake part 221c in order, as shown in FIGS. 9 and 4(b). As shown in FIG. 4(b), an inclination angle inclined upward in a direction away from the front cutting edge 5a, namely, a rake angle is a minumum in the intermediate rake part 221b among the front rake part 221a, intermediate rake part 221b and rear rake part 221c. In other words, the intermediate rake part 221b and the rear rake part 221c are combined together to form the concave parts 221b and 221c. Further, in the present embodiment, the intermediate rake part 221b is inclined downward as the intermediate rake part 221b separates from the front cutting edge 5a, thereby further contributing to reduction in cutting resistance. The pair of second rake surfaces 22 are integrated together and form a flat surface on a further inward side than the rear rake part 221c.

Although the upper part 221 of the second rake surface 22 having the foregoing structure increases cutting resistance in the front rake part 221a having a rake angle β, the contact area between the chips and the second rake surface 22 can be reduced to allow the cutting resistance in the second rake surface 22 to be reduced as a whole by interposing the intermediate rake part 221b having the smallest rake angle between the front rake part 221a and the rear rake part 221c. Consequently, the chips reach the intermediate rake part 221b after the rigidity of the chips is enhanced by stabilization of chip discharge direction in the front rake part (ascending part) 22a, thereby further stabilizing the chip discharge direction.

In the present embodiment, as shown in FIG. 4(b), either the intermediate rake part 221b or the concave part is interposed therebetween. However, no special limitation is imposed on the number of the intermediate rake part 221b or the concave part, and the present embodiment may include a plurality of intermediate rake parts or concave parts.

Next, when performing a traversing process that is machining for enlarging a groove width in grooving process, the second rake surface has a role in curling chips generated from the corner cutting edge 5b and the side cutting edge 5b and passed through near the descending part 23a of a corner rake surface 23 by bringing these chips into contact with the first side part 222a. Specifically, as shown in FIG. 9, in the present embodiment, the chip discharge stability can be improved in a wide range of conditions from a low cutting depth to a high cutting depth, by the fact that the intersection of the upper part 221 and the first side part 222a in the second rake surface 22 separates from the adjacent side cutting edge 5b as the intersection separates from the front cutting edge 5a, and the intersection includes the first curved region A1 projected toward the first rake surface 21 in the planar view. As shown in FIG. 9, the first curved region A1 preferably extends from the front rake part 221a to the intermediate rake part 221b. Under conditions of relatively high cutting depth, the chips generated from the corner cutting edge 5b and the side cutting edge 5b pass through a horizontal rake surface (not shown) lying along the side cutting edge 5b, and are then brought into contact with the first side part 222a. At this time, owing to the intermediate rake part 221b included in the second rake surface 22, the height from the lower surface 3 is lowered. Accordingly, impact exerted on the chips generated from the side cutting edges 5b can be mitigated, thereby preventing these chips from being caught in machined grooves.

Further in the present embodiment, as shown in FIG. 9, the pair of side cutting edges 5b have a smaller mutual distance as the side cutting edges 5b go inward from the front cutting edge 5a in a planar view. Also in this case, the first curved region A1 is preferably configured to separate from the adjacent side cutting edge 5b as the first curved region A1 separates from the front cutting edge 5a in the planar view. This is because a positional relationship between the side cutting edge 5b and the first curved region A1 affects the improvement of the chip discharge stability of the chips generated from the corner cutting edge 6b and the side cutting edge 5b. The first side part 222a is preferably continuous with the front cutting edge 5a. This structure improves the chip discharge stability of the chips generated from the corner cutting edge 5b under cutting conditions of low cutting depth. The intersection of the upper part 221 and the first side part 222a, namely the first curved region A1 is preferably connected to both end portions of the front cutting edge 5a, respectively. In the present embodiment, both end portions of the front cutting edge 5a is a connection point of a pair of corner cutting edges 5c.

<Cutting Tool>

Figure 11:
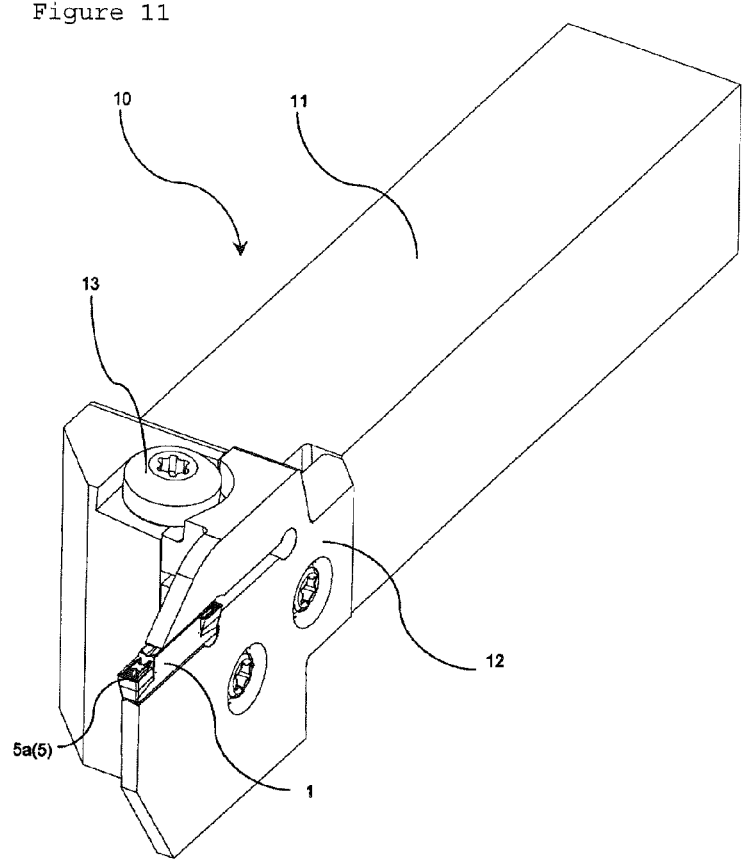
FIG. 11 is a perspective view showing a cutting tool according to an embodiment of the present invention.

A cutting tool according to an embodiment of the present invention is described by exemplifying a cutting tool in which the foregoing insert 1 is applied to grooving process, and by referring to FIG. 11. As another example, the insert 1 is applicable to all of internal grooving process, external grooving process, and cut-off process.

As shown in FIG. 11, the cutting tool 10 of the present embodiment includes the insert 1, a holding member 12 for holding the insert 1 at the front end thereof, and a substantially prismatic holder 11 for attaching the holding member 12 thereto.

The insert 1 is held so that the cutting edge 5 protrudes from the front end of the holding part 12, and the holding member 12 is attached to the holder 11 so that the cutting edge 5 protrudes from the front end of the holder 11. Instead of this structure, a member in which the holder 11 and the holding member 12 are integrally formed together may be employed.

The present embodiment employs so-called clamp-on method in which the insert 1 is constrained by adjusting constraining force with a screw 13 installed at the front end of the holder 11, and by holding down the insert 1 from above. The method for constraining the insert 1 is not limited thereto. For example, it is possible to employ lever-lock method in which a hole is opened in the insert 1, and the insert 1 is constrained from the inner wall of the hole in the insert 1 by using leverage of a substantially L-shaped lever, and camlock method in which the insert 1 is constrained using a hole opened in the insert by using a pin whose shank and head are eccentric.

<Method of Manufacturing Machined Product>

Figure 12:
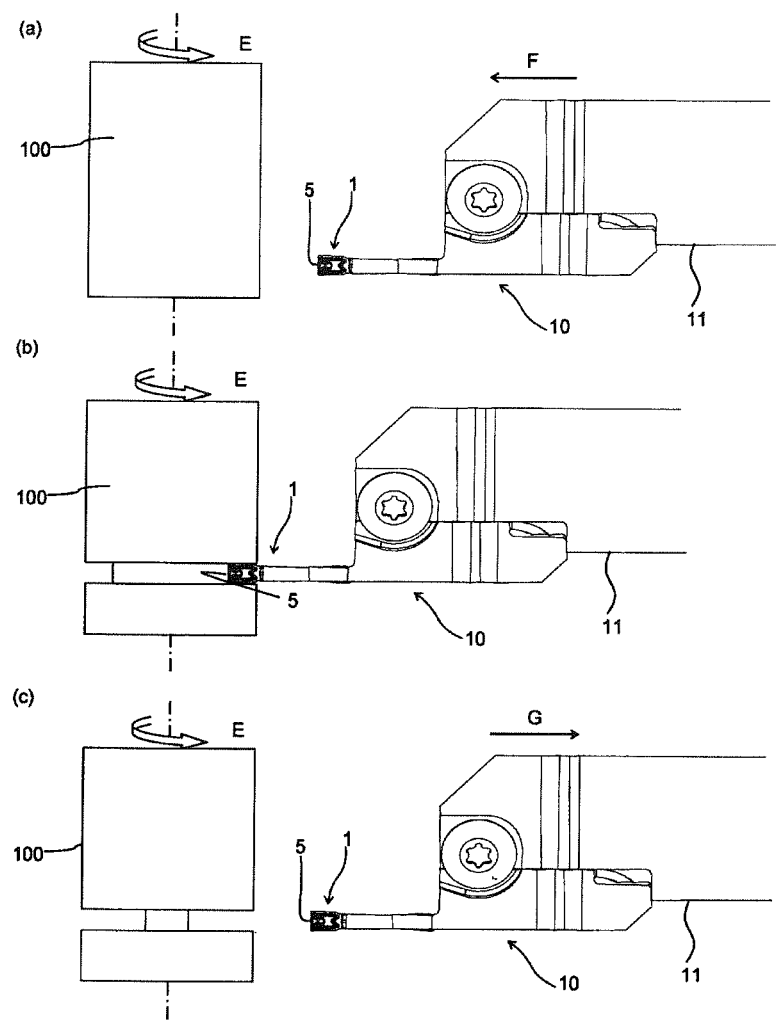
FIG. 12 is a schematic diagram showing a method of manufactured a machined product according to an embodiment of the present invention.

A method of manufacturing a machined product according to an embodiment of the present invention is described below by illustrating the case of applying the insert 1 according to the foregoing third embodiment and the cutting tool 10 with the insert 1 to grooving process, and by referring to FIG. 12.

The method of manufacturing a machined product according to the present embodiment includes the following steps (i) to (iv).

(i) rotating the workpiece 100 in a direction of arrow E, as shown in FIG. 12(a)

In this step, the workpiece 100 and the cutting tool 10 may be brought near each other. For example, the workpiece 100 may be brought near the cutting tool 10.

(ii) bringing the cutting tool 10 near the workpiece 100 being rotated, by moving the cutting tool 10 in a direction of arrow F In this step, the workpiece 100 and the cutting tool 10 may be separated from each other. For example, the workpiece 100 may be separated from the cutting tool 10.

(iii) cutting the workpiece 100 by bringing the cutting edge 5 of the cutting tool 10 into contact with the workpiece 100 being rotated, as shown in FIG. 12(b)

In this step, during the grooving process, the vertical-feed machining for forming grooves is carried out, and the traversing process for enlarging the groove width is carried out.

(iv) separating the cutting tool 10 from the workpiece 100 after being cut, by moving the cutting tool 10 in a direction of arrow G, as shown in FIG. 12(c).

The machined product can be obtained by performing the foregoing steps (i) to (iv). The following excellent effects can be produced at that time.

To be specific, owing to the rake surface having the foregoing structure, the chips generated from the front cutting edge 5a during the vertical-feed machining have different thicknesses depending on the location of the rake surfaces along which the chips graze. Therefore, the chips have the wave shape whose middle part has the concave shape and both end portions have the convex shape in the sectional view. The rake surfaces (first rake surface 21 and second rake surface 22) have the cross-sectional shape as shown in FIG. 10. Therefore, the chips are deformed according to the shapes of the rake surfaces. Thus, the chips become narrower than the width in the width direction of the cutting parts I by being deformed into the wave shape in the sectional view. It is therefore capable of preventing the chips from impairing the machined surface of the workpiece and the components existing around the chips. Additionally, the pair of second rake surfaces 22 respectively include the upper part 221 and the side part 222 (first side part 222a and second side part 222b) as shown in FIG. 9, and have the substantially trapezoidal shape in the sectional view parallel to the front cutting edge 5. Therefore, the second rake surfaces 22 also have a role in reducing the lateral oscillations by making it easier to stabilize the chip discharge direction in a certain direction.

Additionally, during the traversing process, the second rake surfaces 22 have a role in curling the chips generated from the corner cutting edges 5b and the side cutting edges 5b and passed through near the descending part 23 of the corner rake surface 23 by bringing these chips into contact with the first side part 222a. That is, the chip discharge stability can be improved in the wide range of conditions from the low cutting depth to the high cutting depth, by the fact that the intersection of the upper part 221 and the first side part 222a in the second rake surfaces 22 separates from the adjacent side cutting edge 5b as the intersection separates from the front cutting edge 5a, and the intersection includes the first curved region A1 projected toward the first rake surface 21 in the planar view, as shown in FIG. 9.

When the cutting process is continued, it is required to repeat the step of bringing the cutting edge 5 of the cutting tool 10 into contact with different portions of the workpiece 100 while holding the rotation of the workpiece 100. The insert 1 is a two-corner type insert. Therefore, when one of the cutting edges 5 in use is worn, the other cutting edge 5 not yet used may be used.

Representative examples of the material of the workpiece 100 are carbon steel, alloy steel and stainless steel.

When cut-off process is carried out instead of the foregoing grooving process, the vertical-feed machining may be carried out until the workpiece 100 is divided.

While the several embodiments of the present invention have been described and illustrated, it should be understood that the present invention is not limited to the foregoing embodiments, and optional embodiments can be obtained without departing from the spirit and scope of the invention.

For example, in the embodiment of the method of manufacturing the machined product, during the grooving process, the vertical-feed machining for forming the grooves and the traversing process for enlarging the groove width are carried out. The foregoing effects can also be produced by performing only the vertical-feed machining for forming grooves.

DESCRIPTION OF REFERENCE NUMERALS 1 cutting insert
2 upper surface
21 first rake surface
211 bottom part
211a descending part
211b ascending part
212 second side part
212a convex part
22 second rake surface
221 upper part
221a front rake part (ascending part)
221b intermediate rake part (concave part)
221c rear rake part (concave part)
222 side part
222a first side part
222b second side part
A1 first curved region
A2 second curved region
23 corner rake surface
23a descending part
24 boundary parts (212, 222b)
241 convex part (212a)
241a inclined surface
241b top portion
25 inclined part
26 clamp surface
3 lower surface
4 side surface
4a front clearance surface
4b side clearance surface
5 cutting edge
5a front cutting edge
5b side cutting edge
5c corner cutting edge
51 land
10 cutting tool
11 holder
12 holding member
13 screw
100 workpiece

The invention claimed is:

1. A cutting insert, comprising:
   an upper surface,
   a lower surface,
   a side surface, and
   a cutting edge located at an intersection of the upper surface and the side surface, wherein
   the upper surface comprises a rake surface provided continuously with the cutting edge,
   the rake surface comprises
      a first rake surface which is located correspondingly to a middle part of the cutting edge, and is parallel to a horizontal plane including the intersection or is inclined downward as the first rake surface separates from the cutting edge, and
      a pair of second rake surfaces which are located on both sides of the first rake surface, and are inclined upward as the second rake surfaces separate from the cutting edge, and
      each of the pair of second rake surfaces comprises a concave part.

2. The cutting insert according to claim 1, wherein each of width of the pair of second rake surfaces is decreased as the pair of second rake surfaces separate from the cutting edge in a planar view.

3. The cutting insert according to claim 1, wherein a sum of both maximum widths of the pair of second rake surfaces is 30% to 50% of a width of the cutting edge.

4. The cutting insert according to claim 1, wherein
   each of the pair of second rake surfaces further comprises a front rake part inclined upward as the front rake part separates from the cutting edge, and
   the concave part is located further away from the cutting edge than the front rake part.

5. The cutting insert according to claim 1, wherein an absolute value of a difference between an angle formed by the first rake surface and the horizontal plane and an angle formed by the pair of second rake surfaces and the horizontal plane is 25° to 30°.

6. A cutting insert, comprising:
   an upper surface,
   a lower surface,
   a side surface, and
   a cutting edge located at an intersection of the upper surface and the side surface, wherein
   the upper surface comprises a rake surface provided continuously with the cutting edge,
   the rake surface comprises
      a first rake surface which is located correspondingly to a middle part of the cutting edge, and is parallel to a horizontal plane including the intersection or is inclined downward as the first rake surface separates from the cutting edge, and a pair of second rake surfaces which are located on both sides of the first rake surface, and are inclined upward as the second rake surfaces separate from the cutting edge, the first rake surface comprises a pair of convex parts located separately from each other along a direction parallel to the cutting edge, and each of the pair of convex parts comprises an inclined surface inclined upward as the inclined surface separates from the cutting edge.

7. The cutting insert according to claim 6, wherein the pair of convex parts are located at end portions of the first rake surface closer to the pair of second rake surfaces, respectively.

8. The cutting insert according to claim 6, wherein the pair of convex parts have an equal distance from an end portion closer to the cutting edge to the cutting edge.

9. The cutting insert according to claim 6, wherein the inclined surface is curved downward in a sectional view in a direction perpendicular to the cutting edge.

10. The cutting insert according to claim 6, wherein a width of the inclined surface is increased as the inclined surface separates from the cutting edge in a planar view.

11. The cutting insert according to claim 6, wherein each of the pair of second rake surfaces comprises a front rake part which is continuous with the cutting edge and of which width is decreased as the front rake part separates from the cutting edge.

12. The cutting insert according to claim 6, wherein the convex parts have a top portion higher than the cutting edge.

13. A cutting insert, comprising:
an upper surface;
a side surface comprising a front clearance surface and a pair of side clearance surfaces connected to the front clearance surface;
a front cutting edge located at an intersection of the upper surface and the front clearance surface; and
a pair of side cutting edges located at an intersection of the upper surface and the pair of side clearance surfaces, wherein the upper surface comprises
a first rake surface which is continuous with the front cutting edge and comprises a descending part inclined downward as the descending part separates from the front cutting edge, and
a pair of second rake surfaces which is continuous with the front cutting edge and comprises an ascending part inclined upward as the ascending part separates from the front cutting edge, wherein the pair of second rake surfaces which are continuous with both ends of the first rake surface and are located separately from the pair of side cutting edges, each of the pair of second rake surfaces comprises
an upper part,
a first side part continuous with the side cutting edge located adjacent to the first side part of the pair of side cutting edges in the upper part, and
a first curved region at an intersection of the upper part and the first side part, which separates from the adjacent side cutting edge as the first curved region separates from the front cutting edge, and is projected toward the first rake surface in a planar view.

14. The cutting insert according to claim 13, wherein
each of the pair of second rake surfaces comprises a front rake part, an intermediate rake part and a rear rake part which are disposed inwardly in order from the front cutting edge, and
an inclination angle inclined upward as the inclination angle separates from the front cutting edge is a minimum in the intermediate rake part among the front rake part, the intermediate rake part and the rear rake part.

15. The cutting insert according to claim 14, wherein the first curved region extends from the front rake part to the intermediate rake part.

16. The cutting insert according to claim 13, wherein the pair of side cutting edges have a smaller mutual distance as the side cutting edges go inward from the front cutting edge in a planar view.

17. The cutting insert according to claim 13, wherein the first side part is continuous with the front cutting edge.

18. The cutting insert according to claim 13,
further comprising a pair of corner cutting edges which connect the front cutting edge and the pair of side cutting edges, and comprise a curve part with a curved shape,
wherein the intersection of the upper part and the first side part is connected to both end portions of the front cutting edge, respectively.

19. The cutting insert according to claim 18, wherein
the upper surface further comprises a pair of corner rake surfaces continuous with the pair of corner cutting edges, respectively, and
the pair of corner rake surfaces comprise a descending part inclined downward as the descending part separates from the pair of corner cutting edges in an entire region of the pair of corner cutting edges.

20. The cutting insert according to claim 13, wherein
each of the pair of second rake surfaces comprises
a second side part continuous with a side of the upper part closer to the first rake surface, and
a second curved region at the intersection of the upper part and the second side part, which approaches the adjacent side cutting edge as the second curved region separates from the front cutting edge and is projected toward the adjacent side cutting edge in a planar view.

21. A cutting tool, comprising:
a cutting insert according to claim 1; and
a holder configured to attach the cutting insert thereto.

22. A method of manufacturing a machined product, comprising:
bringing the front cutting edge of the cutting tool according to claim 21 into contact with a workpiece being rotated; and thereafter
bringing the side cutting edges of the cutting tool into contact with the workpiece being rotated.

23. A method of manufacturing a machined product, comprising:
rotating a workpiece;
bringing any one of the cutting edge, the front cutting edge and the side cutting edges of the cutting tool according to claim 21 into contact with the workpiece being rotated; and
separating the workpiece and the cutting tool from each other.

* * * * *